United States Patent [19]

Rojecki

[11] Patent Number: 4,798,420
[45] Date of Patent: Jan. 17, 1989

[54] FLUID BRAKE CONTROL SYSTEM FOR RAILROAD VEHICLES

[75] Inventor: Walter E. Rojecki, Watertown, N.Y.
[73] Assignee: General Signal Corporation, Stamford, Conn.
[21] Appl. No.: 121,378
[22] Filed: Nov. 16, 1987
[51] Int. Cl.⁴ .............................................. B60T 17/04
[52] U.S. Cl. ......................................... 303/38; 303/82
[58] Field of Search ...................... 303/33, 35, 36, 37, 303/38, 82, 86

[56] References Cited

U.S. PATENT DOCUMENTS

| | | | |
|---|---|---|---|
| 3,716,276 | 2/1973 | Wilson et al. | 303/82 |
| 4,157,849 | 6/1979 | Wickham | 303/38 |
| 4,175,792 | 11/1979 | Hart | 303/37 |
| 4,188,071 | 2/1980 | Hart | 303/33 |
| 4,206,949 | 6/1980 | Rathband et al. | 303/38 |
| 4,592,598 | 6/1986 | Hintner | 303/37 |

OTHER PUBLICATIONS

Page 51 of NYAB Instruction Pamphlet No. 32 Sup. 4 dated Jan. 1980.

*Primary Examiner*—Duane A. Reger
*Attorney, Agent, or Firm*—Robert R. Hubbard; Harold S. Wynn

[57] ABSTRACT

A fluid brake control system for a railway train has control valves of the ABD type that have service valves that are modified to provide continuous quick service, thus eliminating the need for special accelerated application valves as currently used in ABDW control valves.

20 Claims, 5 Drawing Sheets

PRELIMINARY QUICK SERVICE

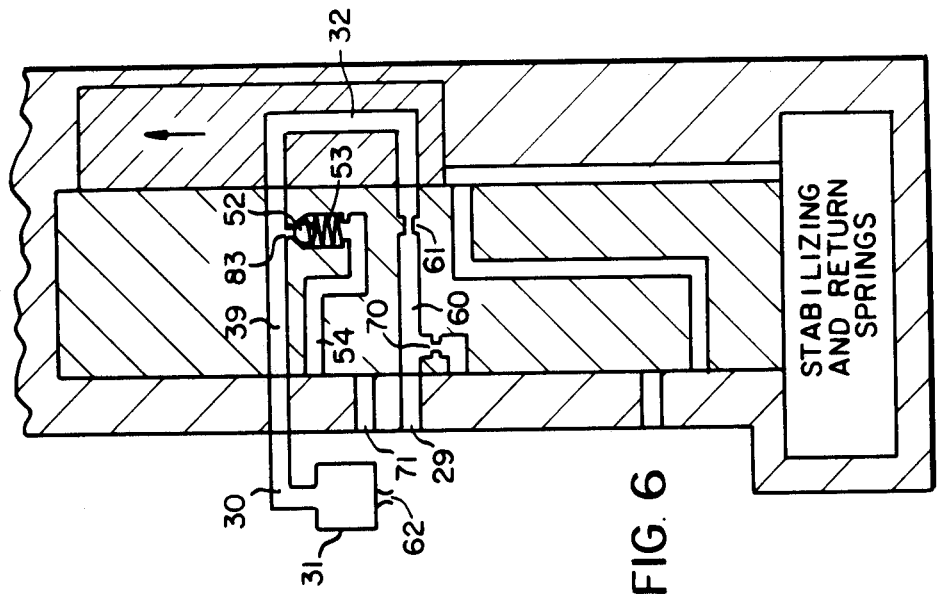
FIG. 6  PRELIMINARY QUICK SERVICE
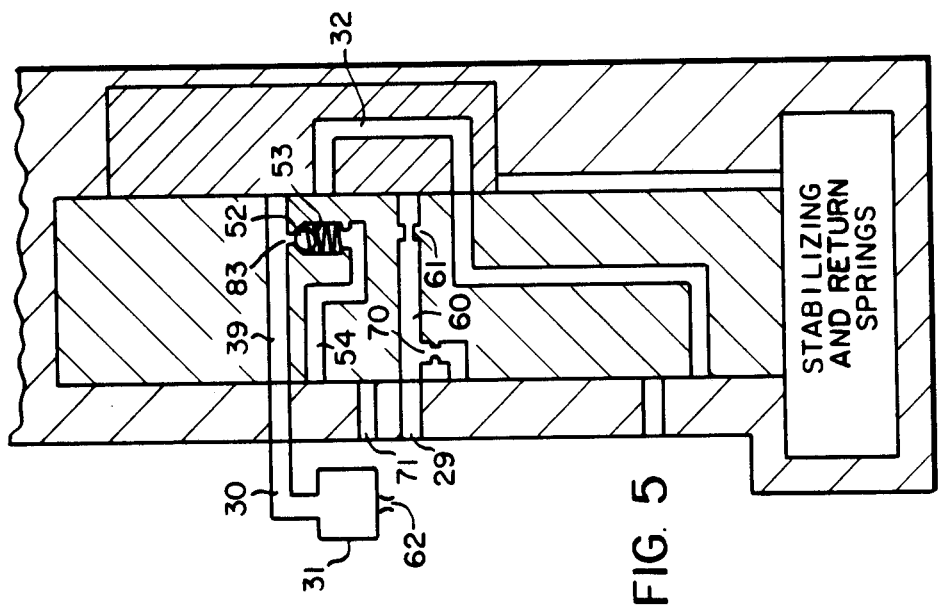
FIG. 5  RELEASE

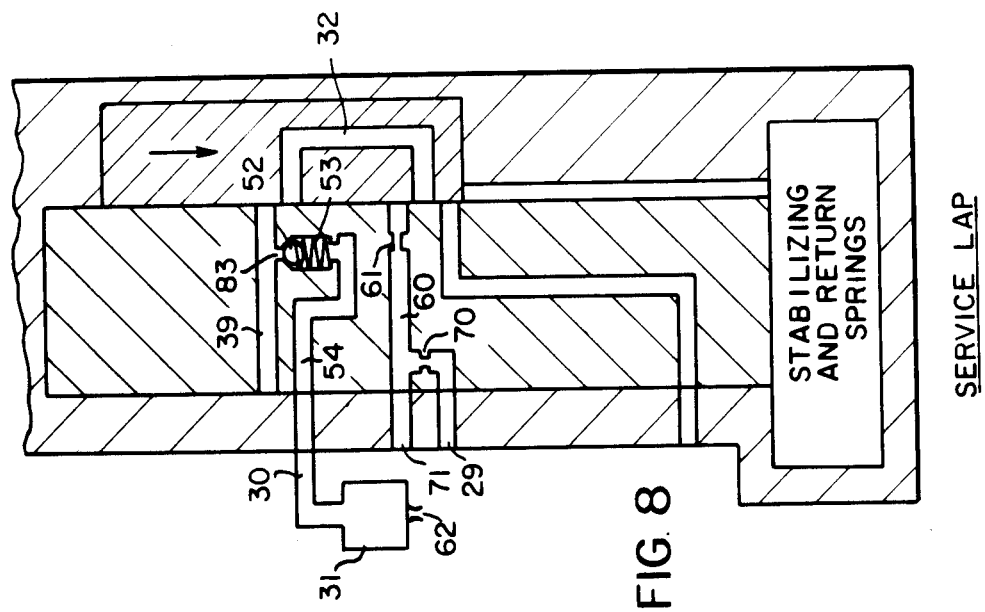
FIG. 8 SERVICE LAP
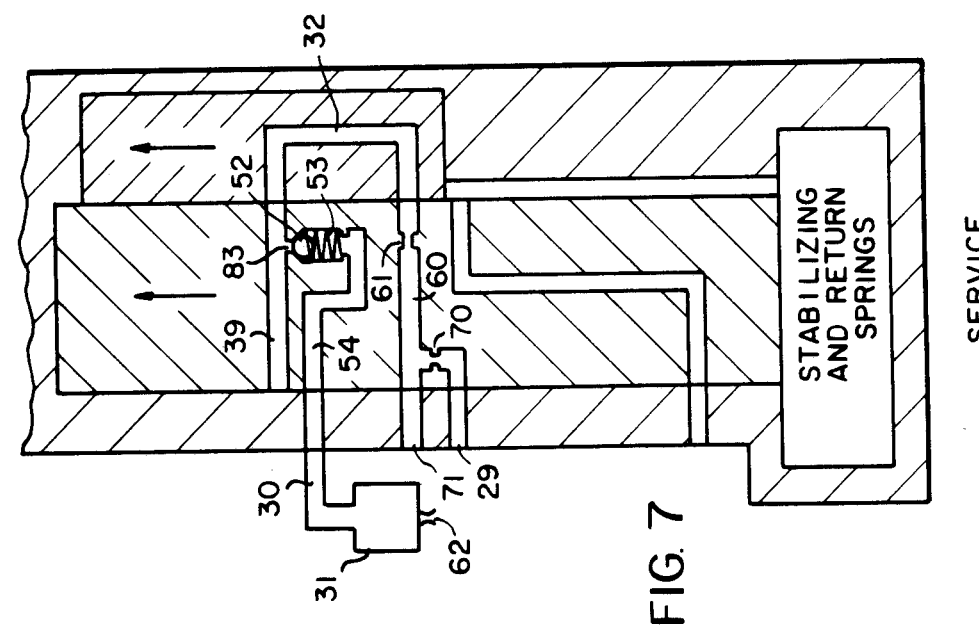
FIG. 7 SERVICE

FLUID BRAKE CONTROL SYSTEM FOR RAILROAD VEHICLES

BACKGROUND OF THE INVENTION

This invention relates to fluid brake control systems for railroad trains and it more particularly relates to modifications of service valves to perform the function of continuous quick service.

The ABD control valve device, which is generally disclosed in the Wilson U.S. Pat. No. 3,232,678 is generally known in the art as a control valve device having a service slide valve providing for a first stage of quick service, known as preliminary quick service, together with a second stage of quick service, when the service valve moves to service position for charging a brake cylinder, or brake motor, from a brake pipe to a predetermined initial pressure, which is generally 10 lbs.. The ABD control valve device has been further improved to provide a third stage of quick service known as continuous quick service by adding an accelerated application diaphragm piston valve as disclosed in the Wilson U.S. Pat. No. 3,175,276, that is controlled by an emergency control slide valve. Such a modified ABD control valve device is currently in use and is generally known as an ABDW control valve device.

An object of the present invention is to provide a fluid brake control system which substantially obviates one or more of the limitations and disadvantages of the described prior art systems.

Another object of the present invention is to incorporate a third stage of quick service in the service slide valve, thus eliminating the need for the accelerated application diaphragm piston valve of current ABDW valves.

Another object of the present invention is to reduce costs by reducing the number of separate valves required in an ABDW control valve device.

Other objects, purposes and characteristic features the present invention will be in part obvious from the accompanied drawings and in part pointed out as the description of the invention progresses.

SUMMARY

A fluid pressure brake control system for a railway train has a normally pressurized brake pipe, a brake motor and a control valve device for each car of the train. The control valve device has an improved service valve providing first, second and third stages of quick service, wherein the first stage is generally known as preliminary quick service, the second stage provides a preliminary charge of the brake motor from the brake pipe with the service valve in its service position and the third stage is continuous quick service when the service valve is in its service position and is effective until the brake pipe pressure is reduced to substantially full service pressure, or the service valve is operated to a service lap position.

DRAWINGS

FIGS. 1A and 1B, when placed end-to-end, is an elevational view, partly in cross-section, and partly schematically, of an ABDW control valve according to the prior art;

FIGS. 5, 6, 7, and 8 illustrate schematically quick service passages under release, preliminary quick service, service, and service lap positions respectively.

Figure 1A:
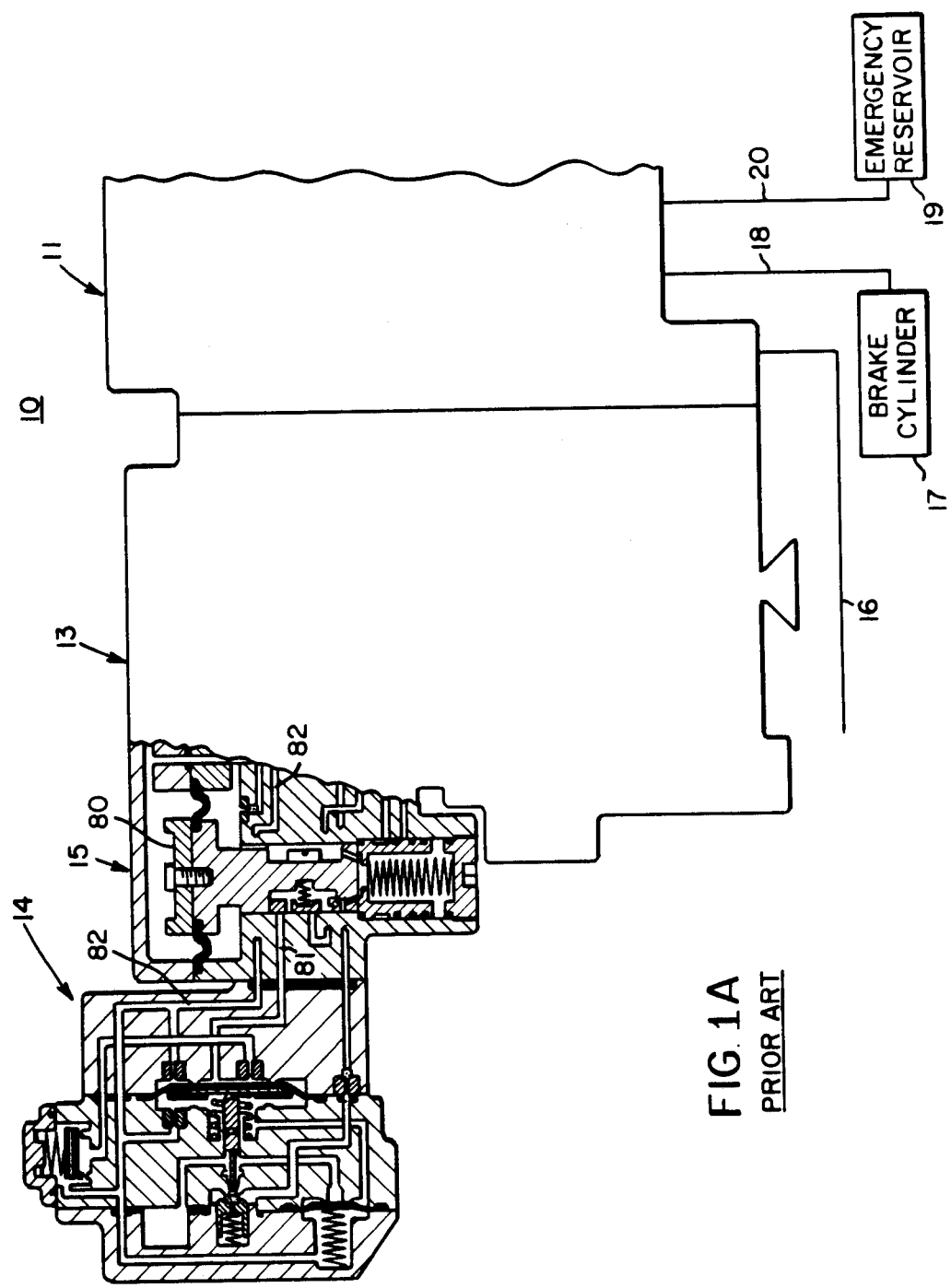
Figure 1B:
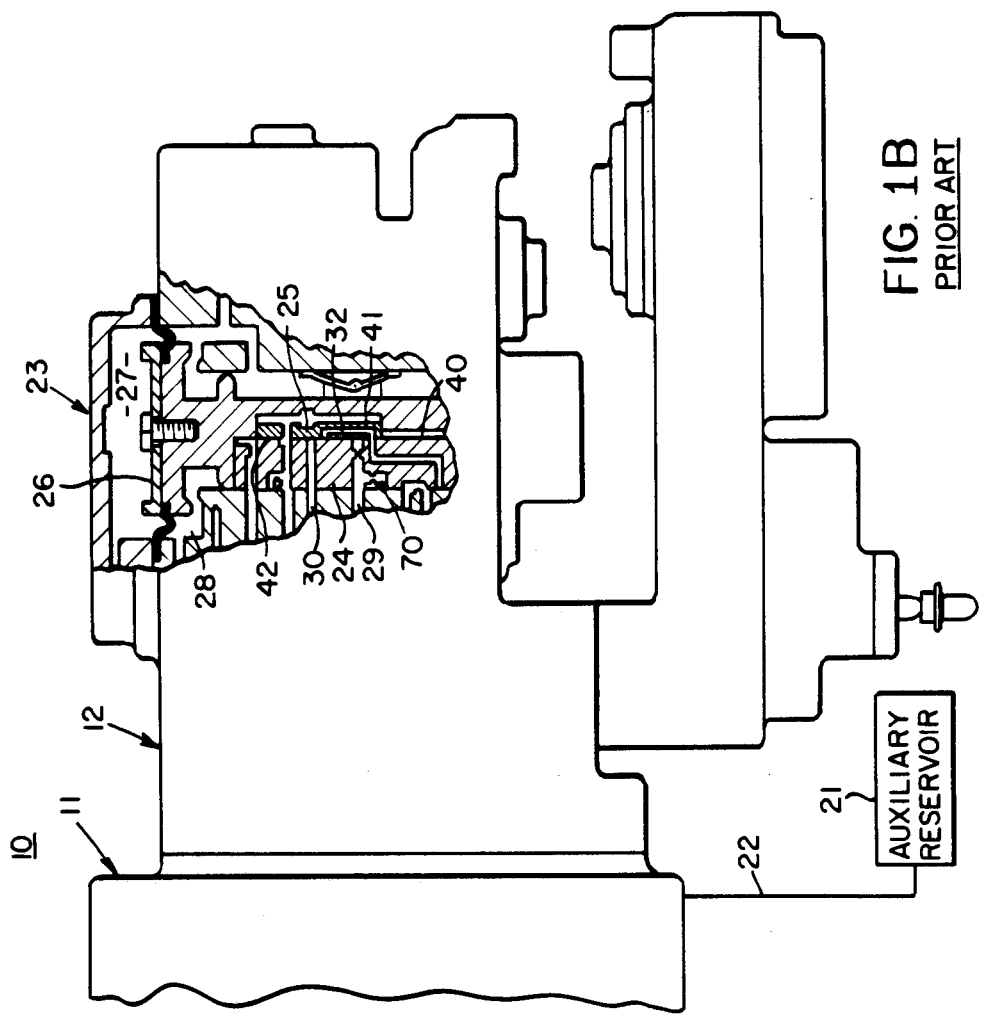

With reference to prior art FIGS. 1A and 1B, an ABDW control valve device 10 is illustrated as having a pipe bracket 11 to which are connected a service valve portion 12 on its righthand side and an emergency valve portion 13 on its lefthand side. An accelerated application valve 14 is attached to the lefthand side of the emergency portion 13 for providing continuous quick service to locally assist in brake pipe pressure reduction when an emergency valve 15 is in its service position.

The pipe bracket 11 has connections to a brake pipe 16, a brake cylinder 17 over a passage 18, an emergency reservoir 19 over a passage 20 and an auxiliary reservoir 21 over a passage 22.

The service portion 12 has a service slide valve device 23 having a service slide valve portion 24 and a graduating slide valve portion 25. A diaphragm piston 26 operates the slide valves 24 and 25, together with return and stabilizing springs (see FIGS. 5-8). The piston 26 compares brake pipe pressure in chamber 27 with auxiliary reservoir pressure in chamber 28.

A passage 29 is connected to the brake pipe and a passage 30 is connected to a quick service volume 31 (see FIG. 5). A passage 32 in the graduating slide valve 25 selectively connects the passages 29 and 30 to provide preliminary quick service (herein after called a first stage of quick service).

Figure 2:
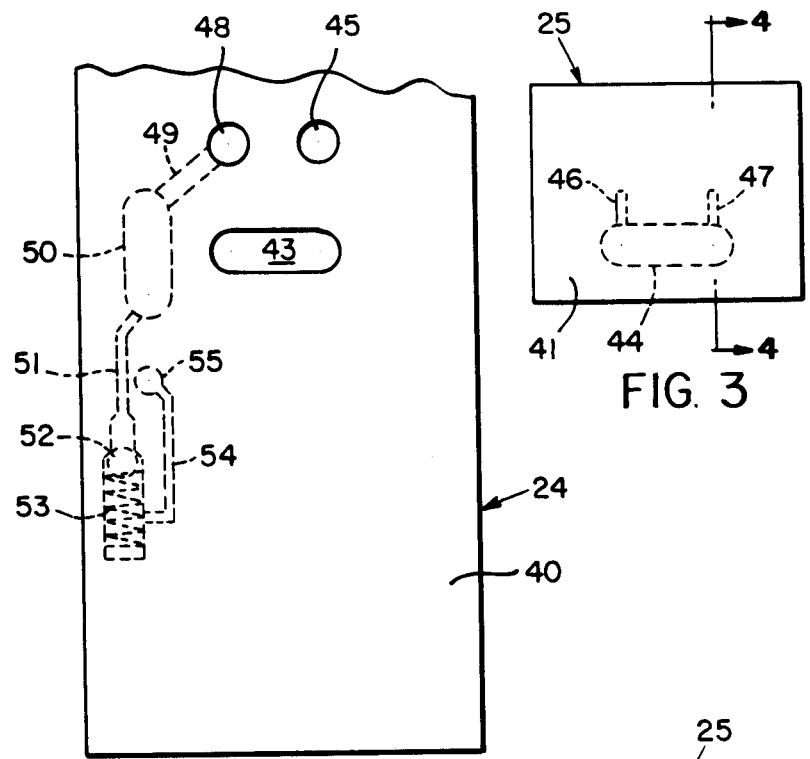
FIG. 2 is an enlarged elevational partial view of a service slide valve face of a service slide valve device of FIG. 1B, modified according to a preferred embodiment of the present invention as shown in broken lines.
Figure 3:
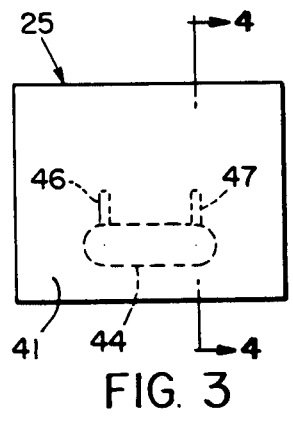
FIG. 3 is an enlarged elevational view of a graduating slide valve whose back surface is a graduating slide valve face that is superimposed upon the slide face of the service slide valve along its centerline, modified according to a preferred embodiment of the present invention as shown in broken lines.
Figure 4:
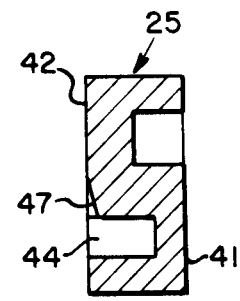
FIG. 4 is a sectional view taken along the section line 4—4 of FIG. 3 as viewed in the direction of the arrows.

With reference to FIG. 2, a slide face 40 of service slide valve 24 is shown that is the slide face 40 at the righthand side of service slide valve 24 shown diagrammatically in FIG. 1B; and with reference to FIG. 3, the face 41 is a view of the right hand side of the graduating slide valve 25 shown diagrammatically in FIG. 1B. With reference to FIG. 4, the graduating slide valve face 42 is a face that slides over the service slide valve face 40 of FIGS. 1B and 2. To simplify the disclosure, only the actual passages of the slide valves 24 and 25 have been shown in FIGS. 2-8 that are involved in the present invention, and it is to be understood that other passages in the slide valves are provided according to usual practices.

In the service slide valve 24 of FIG. 2, these passages include an oval passage 43 that is currently used for preliminary quick service in cooperation with a corresponding oval cavity 44 shown in FIGS. 3 and 4 of the graduating slide valve 25. A hole 45 of FIG. 2 is internally connected to the brake pipe through port 29 of FIG. 1B.

According to the present invention, laterally spaced slots 46 and 47 are milled in the face 42 of the graduating slide valve 25 extending connection of oval caviety 45 upwardly so that they connect to holes 45 and 48 respectively when the graduating slide valve is moved upwardly over the face 40 of service slide valve 24 when service piston 26 moves upwardly to a sevice position. In this position, the oval passage 44 is moved up out of register with the oval passage 43 to terminate a first stage of quick service, generally known as preliminary quick service, as the service valve 23 responds to a brake application signal by pressure reduction in the brake pipe.

With reference to FIG. 2, internal passages 49, 50 and 51 are formed to connect the slot 46, during continuous quick service, through a check valve 52 having a spring 53 preset to service brake pipe pressure (about 50 lbs.), and through passage 54 to an exhaust opening 55 that is made to register with a passage 30 of FIG. 1B when the slide valve 24 and 25 are in their service positions. This passage 30 is connected to the quick service volume 31 as shown in FIG. 7.

Having thus considered the general organization of a control slide valve device according to the present invention, further consideration will now be given relative to how quick service is rendered effective by the slide valve device 23, modified according to FIGS. 2–4 in first, second and third stages respectively, the first and second stages using the same organization as in the prior art ABDW valve of FIGS. 1A and 1B.

FIRST STAGE OF QUICK SERVICE

In response to brake pipe pressure reduction to signal a service brake application, the reduction of brake pipe pressure in chamber 27, over the piston 26 (see FIG. 1B), causes the piston 26 to move upwardly to provide a first stage of quick service, generally known as preliminary quick service. The piston 26 carries the graduating slide valve 25 upwardly relative to the service slide valve 24 to render the first stage of quick service connection effective as shown in the diagram of FIG. 6 wherein fluid from the brake pipe 16, which is applied at port 29 of the service valve device 23, is vented to atmosphere through passage 60, choke 61, passages 32 and 39, port 30 of the service valve 23, quick service volume 31, and a choke 62. The filling of quick service volume 31 provides a local preliminary brake pipe reduction that continues until there is sufficient pressure differential across diaphragm piston 26 (see FIG. 1B) to move the service slide valve 24 upwardly to service position.

SECOND STAGE OF QUICK SERVICE

In service position, a second stage of quick service becomes effective (see FIG. 7), wherein brake pipe fluid flows through port 29, choke 70 and port 71 of the service valve device 23 to a quick service limiting valve and inshot valve (not shown) and over a passage 18 (see FIG. 1A) to the brake cylinder 17. The quick service limiting valve (not shown) cuts off the brake pipe fluid connection to the brake cylinder 17 after brake cylinder pressure has been built up to approximately 10 lbs pressure to terminate the second stage of quick service.

THIRD STAGE OF QUICK SERVICE

The third stage of quick service, that is generally known as continuous quick service, is a system of quick service that continuously, or periodically, vents the brake pipe at a rate corresponding to a service rate of reduction in the brake pipe. The accelerated application valve 14 (see FIG. 1A) of the prior art ABDW control valve device 14 is driven by the venting of quick action chamber control fluid through the emergency slide valve 15 to maintain emergency diaphragm 80 in a service position to prevent an emergency application in response to a service application signal in the brake pipe. In an ABD valve, this venting of the quick action chamber is directly to atmosphere, but in the prior art ABDW valve, this venting is applied through passage 81 to the control of the accelerated application valve 14 which periodically vents the brake pipe 16 to atmosphere.

According to the present invention, valve 14 is eliminated because it is no longer needed and the passage 81 is connected directly into vent passage 82 as is done in the ABD valve.

With reference to FIG. 7, in the service position, the upward movement of the service slide valve 24 and the graduating slide valve 25 disconnects port 30 and the quick service volume 31 from preliminary quick service passage 39 and connects the port 30 to the passage 54 to render the continuous quick service effective to vent brake pipe fluid through port 29, service slide valve 24 passage 60 and choke 61, graduating valve passage 32 (diagrammatically representing passages 47, 44 and 46 as shown in FIG. 3), service slide valve 24, choke 83, check valve 52 and passage 54 to the service valve device port 30 for venting through quick action chamber 31 and its choke 62 to atmosphere. The size of passage 51 of FIG. 2 is such as to act as a choke to limit the local venting of the brake pipe by continuous quick service to a rate comparable to the normal input rate of venting the brake pipe during service application.

When the venting of the brake pipe 16 is terminated, either for a partial application or for a full service application, the service slide valve becomes operated to a service lap position in which the third stage of quick service becomes cut off as illustrated in FIG. 8 by the downward movement of the graduating slide valve 25 relative to the service slide valve 24 to disconnect passage 32 of FIG. 8 (passages 45 and 48 of actual valve structure illustrated in FIG. 2).

Thus the venting during continuous quick service can be at a substantially steady rate, or the rate may be intermittently varied in accordance with movement of the graduating slide valve 25 as the piston 26 responds to variations in the rate of reduction in the brake pipe 16. In any vent, the 50 lb. pressure check valve 52 cuts off continuous quick service when input brake pipe reduction to the control valve device 10 is at a 50 lb. normal service pressure, or at an over reduction rate less than the 50 lb. pressure so that there is no continuous quick service during over reduction.

It will be apparent that with the slide valve changes that have been described for the service slide valve device 23, all of the features of current continuous quick service can be provided by the service slide valve device 23 that is now provided by accelerated application valve 14 (see FIG. 1A) of the currently used ABDW valve of the prior art.

Therefore the ABDW valve can now be modified to eliminate the cost of the present accelerated application valve 14 by simply modifying the service slide valve 24 and graduating slide valve 25 of the service valve 23 as shown in FIGS. 2–4. Furthermore, the feature of continuous quick service can simply be added to an existing ABD valve device by substituting the herein described modified slide valves 24 and 25 for the prior corresponding service slide valves.

Having thus described a fluid brake control system for railroad vehicles having an improved control valve device as a preferred embodiment of the present inven- tion, it is to be understood that various modifications and alterations may be made to the specific embodiment shown, without departing from the spirit or scope of the present invention.

I claim:

1. A fluid pressure brake control system for a railway train having a normally charged brake pipe, a brake motor and a control valve device for each car of the train wherein the the control valve device has an improved service valve device comprising:
   (a) service slide valve means having passages governing a first stage of quick service preliminarily effective upon sensing a pressure reduction in the brake pipe for venting fluid from the brake pipe to atmosphere through a quick service volume,
   (b) said slide valve means having other passages governing a second stage of quick service effective when the service valve is in a service position for initially charging the brake motor from the brake pipe to a predetermined limited pressure,
   (c) said slide valve means having still further passages governing a third stage of quick service effective when the service valve is in a service position for substantially continuously venting fluid from the brake pipe to atmosphere at a controlled rate comparable to a service rate of reduction in the brake pipe.

2. A fluid pressure brake control system according to claim 1 wherein said slide valve means terminates the first stage of quick service upon movement of the service valve to a service position.

3. A fluid pressure brake control system according to claim 2 wherein said slide valve means opens pasasges during the third stage of quick service to vent fluid from the brake pipe through the quick service volume.

4. A fluid pressure brake control system according to claim 3 wherein said slide valve means comprises a continuous quick service passage having a check valve for permitting venting of the brake pipe by the service slide valve means during the third stage of quick service only until the brake pipe pressure is reduced to substantially full service pressure.

5. A fluid pressure brake control system according to claim 1 wherein the service valve device has a spring biased piston comparing brake pipe and auxiliary reservoir pressures for operating the service side valve means through the first, second and third quick service stages respectively.

6. A fluid pressure brake control system according to claim 5 wherein the service slide valve means has a service slide valve portion and a graduating slide valve portion operated by the piston to govern the first, second, and third quick service stages of quick service.

7. A fluid pressure brake control system according to claim 6 wherein the graduating slide valve portion and service slide valve portion have cooperating valve faces and passages for governing the first stage of quick service.

8. A fluid pressure brake control system according to claim 7 wherein the graduating slide valve portion and service slide valve portion have cavities in the slide valve faces to govern a first interval when the first stage of quick service is effective to vent fluid from the brake pipe to atmosphere.

9. A fluid pressure brake control system according to claim 8 wherein cooperating graduating slide valve portion and service slide valve portion have cavities in the slide valve faces to also govern a second interval when the third stage of quick service is effective to continuously vent fluid from the brake pipe to atmosphere.

10. A fluid pressure brake control system according to claim 9 wherein fluid vented from the brake pipe during the third stage of quick service is vented through a passage having a choke and the quick service volume.

11. A fluid pressure brake control system according to claim 10 wherein fluid vented from the brake pipe during the third stage of quick service is through a check valve which is contained within the service slide valve portion.

12. A fluid pressure brake control system for a railway train having a normally charged brake pipe, a brake motor and a control valve device for each car of the train wherein the control valve device has an improved service slide valve device comprising continuous quick service slide valve means including a passage having a check valve in a slide valve portion effective when the service valve is in its service position for substantially continuously venting the brake pipe at a controlled rate only until the brake pipe fluid pressure is reduced to service application pressure.

13. A fluid pressure brake control system according to claim 12 wherein the continuous quick service slide valve means has a service slide valve portion and a graduating slide valve portion which cooperate by passages in adjoining valve faces to control continuous quick service to render it effective to vent the brake pipe when the slide valves are in their service braking positions for an interval only until brake pipe fluid pressure is reduced to full service pressure.

14. A fluid brake control system according to claim 13 wherein matching oval cavities in the service slide valve portion and in the graduating slide valve portion are used both for controlling the venting of the brake pipe for continuous quick service and for the venting of the brake pipe for preliminary quick service.

15. A fluid brake control system according to claim 14 wherein the oval cavity of the graduating slide valve portion has spaced passages extending laterally therefrom for contacting respective passages of the service slide valve portion when the slide valves are in a service position for rendering continuous quick service effective.

16. A fluid brake control system according to claim 15 wherein the passages connect to the oval cavity in the graduating slide valve portion near opposite ends thereof are of such a length as to render continuous quick service effective upon turning off the preliminary quick service when the service slide valve portion moves to service position.

17. A fluid brake control system according to claim 14 wherein brake pipe fluid of both the continuous quick service and the preliminary quick service is vented through the same quick service volume.

18. A fluid pressure brake control system for a railway train having a brake pipe, a control valve device connected to the brake pipe having ports for connection to a brake motor and an auxiliary reservoir, wherein the control valve device has an improved multiposition service slide valve means comprising;
   (a) a release position to which the service valve is operated by fluid from the brake pipe after charging an auxiliary reservoir through the auxiliary reservoir port,
   (b) a preliminary quick service position to which the service slide valve means is operated upon initially sensing reduction of pressure in the brake pipe for charging a quick service volume, that is vented through a choke to atmosphere, from the brake pipe, (c) a service position to which the service slide valve means is operated in response to further reduction of pressure in the brake pipe for disconnecting the brake pipe from the quick service volume and connecting the brake pipe and an auxiliary reservoir port through respective chokes to the brake motor port, (d) continuous quick service means rendered effective by operating the service slide valve to its service position having passages for reconnecting the brake pipe to the quick service volume, and (e) brake pipe pressure sensing means for rendering the continuous quick service means ineffective when brake pipe pressure is reduced to full service brake pressure during brake application.

19. A fluid pressure brake control system according to claim 18 wherein the service valve has a further lap position in which the continuous quick service means is rendered inactive.

20. A fluid pressure brake control system according to claim 18 wherein the brake pipe pressure sensing means comprises a pressure cut-off valve set to cut off when brake pipe pressure is reduced to full service brake pressure.

* * * * *